US009536536B2

(12) United States Patent
Hetherington et al.

(10) Patent No.: US 9,536,536 B2
(45) Date of Patent: *Jan. 3, 2017

(54) ADAPTIVE EQUALIZATION SYSTEM

(71) Applicant: 2236008 Ontario Inc., Waterloo (CA)

(72) Inventors: Phillip Alan Hetherington, Port Moody (CA); Xueman Li, Burnaby (CA)

(73) Assignee: 2236008 Ontario Inc., Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/790,875

(22) Filed: Jul. 2, 2015

(65) Prior Publication Data

US 2015/0302862 A1 Oct. 22, 2015

Related U.S. Application Data

(63) Continuation of application No. 14/469,305, filed on Aug. 26, 2014, now Pat. No. 9,099,084, which is a (Continued)

(51) Int. Cl.
*G10L 19/14* (2006.01)
*G10L 21/02* (2013.01)
(Continued)

(52) U.S. Cl.
CPC ............... *G10L 21/02* (2013.01); *G10L 19/09* (2013.01); *G10L 25/60* (2013.01)

(58) Field of Classification Search
USPC ........ 704/226, 225, 236, 240, 244, 233, 224
See application file for complete search history.

(56) References Cited

U.S. PATENT DOCUMENTS 5,046,103 A * 9/1991 Warnaka ............ G10K 11/1784 381/71.5
7,383,175 B2 * 6/2008 Doran .................... G10L 25/90 704/207
(Continued)

OTHER PUBLICATIONS

Awad, S.S., "The application of digital speech processing to stuttering therapy," in Instrumentation and Measurement Technology Conference, 1997. IMTC/97. Proceedings. Sensing, Processing, Networking., IEEE , vol. 2, No., pp. 1361-1367 vol. 2, May 19-21, 1997.*

*Primary Examiner* — Edgar Guerra-Erazo
(74) *Attorney, Agent, or Firm* — Brinks Gilson & Lione

(57) ABSTRACT

An adaptive equalization system that adjusts the spectral shape of a speech signal based on an intelligibility measurement of the speech signal may improve the intelligibility of the output speech signal. Such an adaptive equalization system may include a speech intelligibility measurement module, a spectral shape adjustment module, and an adaptive equalization module. The speech intelligibility measurement module is configured to calculate a speech intelligibility measurement of a speech signal. The spectral shape adjustment module is configured to generate a weighted long-term speech curve based on a first predetermined long-term average speech curve, a second predetermined long-term average speech curve, and the speech intelligibility measurement. The adaptive equalization module is configured to adapt equalization coefficients for the speech signal based on the weighted long-term speech curve.

20 Claims, 4 Drawing Sheets

Related U.S. Application Data continuation of application No. 13/464,411, filed on May 4, 2012, now Pat. No. 8,843,367.

(51) Int. Cl.

| | |
|---|---|
| ***G10L 15/20*** | (2006.01) |
| ***G10L 15/00*** | (2013.01) |
| ***G10L 15/06*** | (2013.01) |
| ***G10L 25/60*** | (2013.01) |
| ***G10L 19/09*** | (2013.01) |

(56) References Cited

U.S. PATENT DOCUMENTS

| | | | | |
|---|---|---|---|---|
| 8,712,069 | B1 * | 4/2014 | Murgia | H04R 3/005<br>381/71.1 |
| 8,843,367 | B2 * | 9/2014 | Hetherington | G10L 25/60<br>704/224 |
| 9,099,084 | B2 * | 8/2015 | Hetherington | G10L 25/60 |
| 2004/0133424 | A1 * | 7/2004 | Ealey | G10L 25/90<br>704/233 |
| 2004/0193405 | A1 * | 9/2004 | Doran | G10L 25/90<br>704/207 |
| 2006/0106603 | A1 * | 5/2006 | Boillot | G10L 21/0364<br>704/238 |
| 2007/0208558 | A1 * | 9/2007 | de Matos | H04R 5/027<br>704/226 |
| 2008/0147413 | A1 * | 6/2008 | Sobol-Shikler | G10L 13/033<br>704/278 |
| 2009/0144053 | A1 * | 6/2009 | Tamura | G10L 13/06<br>704/207 |

* cited by examiner

ADAPTIVE EQUALIZATION SYSTEM

RELATED APPLICATION

This application is a continuation of application Ser. No. 14/469,305 filed on Aug. 26, 2014, titled "Adaptive Equalization System," which is a continuation of application Ser. No. 13/464,411 filed on May 4, 2012, titled "Adaptive Equalization System," now U.S. Pat. No. 8,843,367, both of which are incorporated by reference in their entirety.

BACKGROUND

1. Technical Field

This application relates to sound processing and, more particularly, to adaptive equalization of speech signals.

2. Related Art

A speech signal may be adversely impacted by acoustical or electrical characteristics of the acoustical environment or the electrical audio path associated with the speech signal. For example, for a hands-free telephone system in an automobile, the in-car acoustics or microphone characteristics may have a significant detrimental impact on the sound quality or intelligibility of a speech signal transmitted to a remote party.

Many speech enhancement systems have been developed to suppress background noise and improve speech quality, but little progress has been made to improve speech intelligibility. In recent years, researchers have investigated why current speech enhancement algorithms do not improve speech intelligibility. As a result, new algorithms have been developed that focus on speech intelligibility improvement. However, some of these algorithms require a voicing decision, which may be difficult to achieve in a noisy environment. Other proposed algorithms need additional training, or they need to know the clean speech and noise level in advance, which may not be possible in some applications.

BRIEF DESCRIPTION OF THE DRAWINGS

The system may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

This detailed description describes an adaptive equalization system that improves the intelligibility of a speech signal. For example, the system may automatically adjust the spectral shape of the speech signal to improve speech intelligibility. Equalization techniques such as parametric or graphic equalization have long been implemented in audio products to improve sound quality. For example, an equalization curve is often tuned for a specific environment based on experience or to a particular target, but then usually remains unchanged during production or real-time use. In the adaptive equalization system described herein, the equalizer is adapted based on a target shape. This system attempts to automatically compensate for deficiencies in the audio path, which makes the output speech more pleasing and intelligible even in the presence of noise. In some implementations, the system may achieve this increase in intelligibility without requiring a voicing decision and without requiring advanced knowledge of the clean speech and the noise level. Thus, the system may be implemented in real-time applications where only noisy speech is available.

Figure 1:
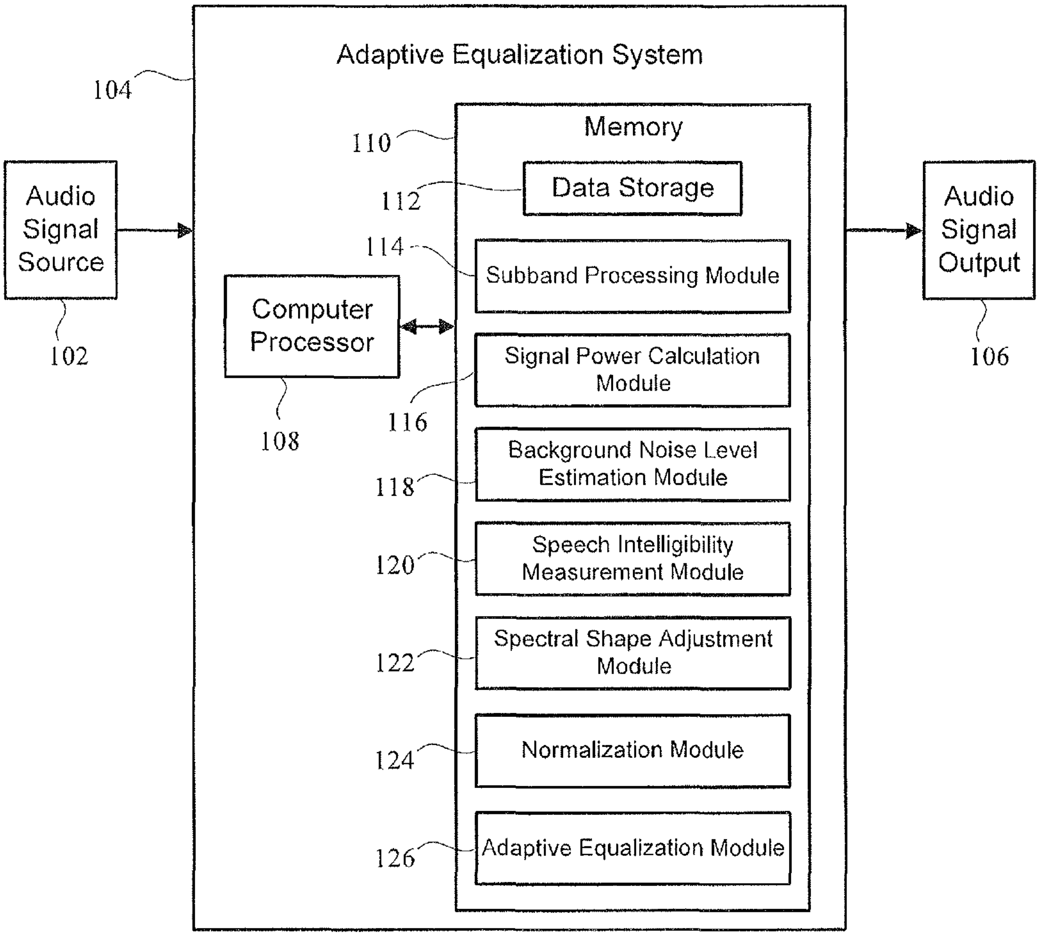
FIG. 1 illustrates an adaptive equalization system.

FIG. 1 illustrates a system that includes an audio signal source 102, an adaptive equalization system 104, and an audio signal output 106. The adaptive equalization system 104 receives an input speech signal from the audio signal source 102, processes the signal, and outputs an improved version of the input signal to the audio signal output 106. In one implementation, the output signal received by the audio signal output 106 may be more intelligible to a listener than the input signal received by the adaptive equalization system 104. The audio signal source 102 may be a microphone, an incoming communication system channel, a pre-processing system, or another signal input device. The audio signal output 106 may be a loudspeaker, an outgoing communication system channel, a speech recognition system, a post-processing system, or any other output device.

The adaptive equalization system 104 includes a computer processor 108 and a memory device 110. The computer processor 108 may be implemented as a central processing unit (CPU), microprocessor, microcontroller, application specific integrated circuit (ASIC), or a combination of other type of circuits. In one implementation, the computer processor is a digital signal processor ("DSP") including a specialized microprocessor with an architecture optimized for the fast operational needs of digital signal processing. Additionally, in some implementations, the digital signal processor may be designed and customized for a specific application, such as an audio system of a vehicle or a signal processing chip of a mobile communication device (e.g., a phone or tablet computer). The memory device 110 may include a magnetic disc, an optical disc, RAM, ROM, DRAM, SRAM, Flash and/or any other type of computer memory. The memory device 110 is communicatively coupled with the computer processor 108 so that the computer processor 108 can access data stored on the memory device 110, write data to the memory device 110, and execute programs and modules stored on the memory device 110.

The memory device 110 includes one or more data storage areas 112 and one or more programs. The data and programs are accessible to the computer processor 108 so that the computer processor 108 is particularly programmed to implement the adaptive equalization functionality of the system. The programs may include one or more modules executable by the computer processor 108 to perform the desired function. For example, the program modules may include a subband processing module 114, a signal power calculation module 116, a background noise level estimation module 118, a speech intelligibility measurement module 120, a spectral shape adjustment module 122, a normalization module 124, and an adaptive equalization module 126. The memory device 110 may also store additional programs, modules, or other data to provide additional programming to allow the computer processor 108 to perform the functionality of the adaptive equalization system 104. The described modules and programs may be parts of a single program, separate programs, or distributed across several memories and processors. Furthermore, the programs and modules, or any portion of the programs and modules, may instead be implemented in hardware.

Figure 2:
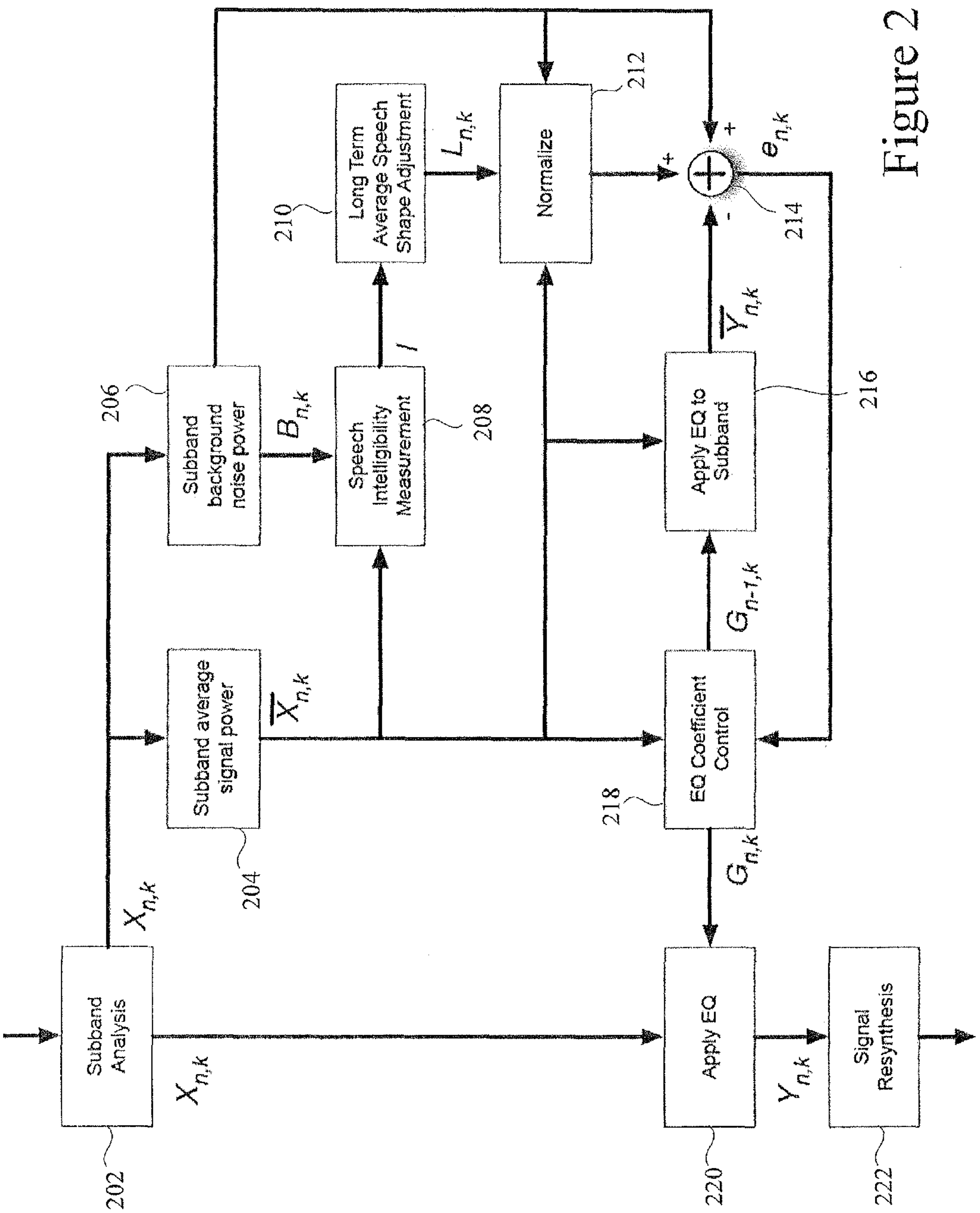
FIG. 2 illustrates the functionality of the adaptive equalization system of FIG. 1.

FIG. 2 is a flow chart illustrating the functionality of the adaptive equalization system of FIG. 1. The functionality of FIG. 2 may be achieved by the computer processor 108 accessing data from data storage 112 of FIG. 1 and by executing one or more of the modules 114-126 of FIG. 1. For example, the processor 108 may execute the subband processing module 114 at steps 202 and 222, the signal power calculation module 116 at step 204, the background noise level estimation module 118 at step 206, the speech intelligibility measurement module 120 at step 208, the spectral shape adjustment module 122 at step 210, the normalization module 124 at step 212, and the adaptive equalization module 126 at steps 214, 216, 218, and 220. Any of the modules or steps described herein may be combined or divided into a smaller or larger number of steps or modules than what is shown in FIGS. 1 and 2.

Figure 3:
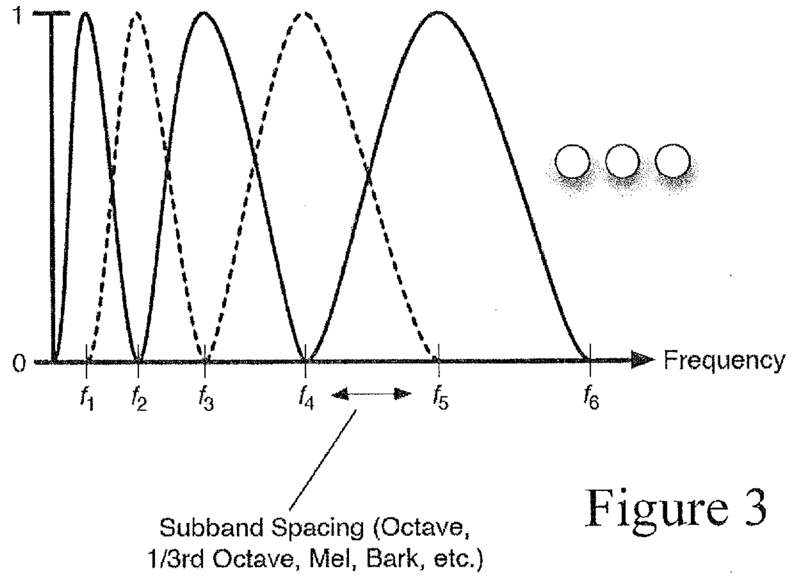
FIG. 3 illustrates one implementation of a subband processing filterbank.

The adaptive equalization system may begin its signal processing sequence in FIG. 2 with subband analysis at step 202. The system may receive an input speech signal that includes speech content, noise content, or both. At step 202, a subband filter processes the input signal to extract frequency information of the input signal. The subband filter may be accomplished by various methods, such as a Fast Fourier Transform ("FFT"), critical filter bank, octave filter bank, or one-third octave filter bank. The subband analysis at step 202 may include a frequency based transform, such as by a Fast Fourier Transform. Alternatively, the subband analysis at step 202 may include a time based filterbank. The time based filterbank may be composed of a bank of overlapping bandpass filters, where the center frequencies have non-linear spacing such as octave, 3rd octave, bark, mel, or other spacing techniques. As an example, FIG. 3 illustrates the filter shapes of one implementation of a subband processing filterbank. As shown in FIG. 3, the bands may be narrower at lower frequencies and wider at higher frequencies. In the filterbank used at step 202, the lowest and highest filters may be shelving filters so that all the components may be resynthesized to essentially recreate the same input signal when no processing has been applied. A frequency based transform may use essentially the same filter shapes applied after transformation of the signal to create the same non-linear spacing or subbands. The frequency based transform may also use a windowed add/overlap analysis.

The subband processing at step 202 outputs a set of subband signals represented as $X_{n,k}$, which is the kth subband at time n. At step 204, the system receives the subband signals and determines the subband average signal power of each subband. The subband average signal power output from step 204 is represented as $\overline{X}_{n,k}$. In one implementation, for each subband, the subband average signal power is calculated by a first order Infinite Impulse Response ("IIR") filter according to the following equation:

$$|\overline{X}_{n,k}|^2=\beta|X_{n-1,k}|^2+(1-\beta)|X_{n,k}|^2.$$

Here, $|X_{n,k}|^2$ is the signal power of kth suband at time n, and β is a coefficient in the range between zero and one. In one implementation, the coefficient β is a fixed value. For example, the coefficient β may be set at a fixed level of 0.9, which results in a relatively high amount of smoothing. Other higher or lower fixed values are also possible depending on the desired amount of smoothing. In other implementations, the coefficient β may be a variable value. For example, the system may decrease the value of the coefficient β during times when a lower amount of smoothing is desired, and increase the value of the coefficient β during times when a higher amount of smoothing is desired.

At step 204, the subband signal is smoothed, filtered, and/or averaged. The amount of smoothing may be constant or variable. In one implementation, the signal is smoothed in time. In other implementations, frequency smoothing may be used. For example, the system may include some frequency smoothing when the subband filters have some frequency overlap. The amount of smoothing may be variable in order to exclude long stretches of silence into the average or for other reasons. The power analysis processing at step 204 outputs a smoothed magnitude/power of the input signal in each subband.

At step 206, the system receives the subband signals and estimates a subband background noise level for each subband. The subband average signal power output from step 206 is represented as $B_{n,k}$. In one implementation, the background noise level is calculated using the background noise estimation techniques disclosed in U.S. Pat. No. 7,844,453, which is incorporated herein by reference, except that in the event of any inconsistent disclosure or definition from the present specification, the disclosure or definition herein shall be deemed to prevail. In other implementations, alternative background noise estimation techniques may be used, such as a noise power estimation technique based on minimum statistics. The background noise level calculated at step 206 may be smoothed and averaged in time or frequency. The output of the background noise estimation at step 206 may be the magnitude/power of the estimated noise for each subband.

At step 208, the system performs a speech intelligibility measurement. The speech intelligibility measurement outputs a value, represented as I, that is indicative of the intelligibility of the speech content in the input signal. The value may be within the range between zero and one, where a value closer to zero indicates that the speech signal has a relatively low intelligibility and where a value closer to one indicates that the speech signal has a relatively high intelligibility. In one implementation, the system calculates a Speech Intelligibility Index ("SII") at step 208. The Speech Intelligibility Index may be calculated by the techniques described in the American National Standard, "Methods for the Calculation of the Speech Intelligibility Index," ANSI S3.5-1997. In other implementations, other objective intelligibility measures, such as the speech articulation index ("AI") or speech-transmission index ("STI") can also be used to predict speech intelligibility.

Figure 4:
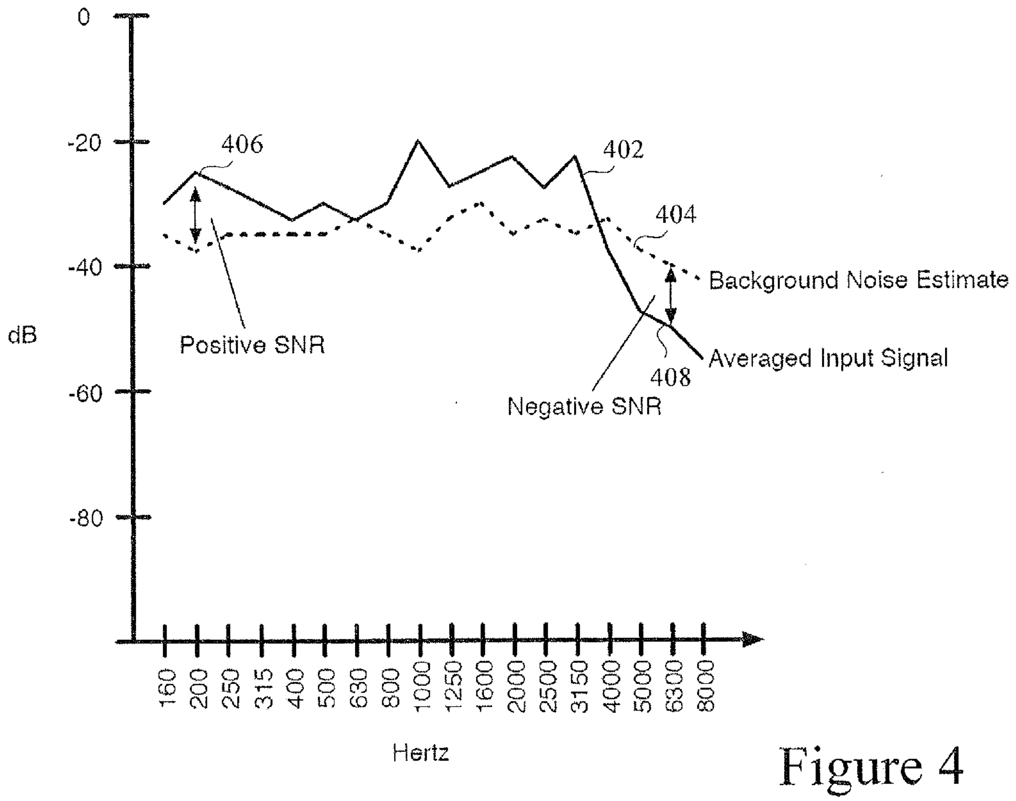
FIG. 4 is a graph illustrating one implementation of a signal power estimate and a background noise estimate of a speech signal.

The speech intelligibility measurement at step 208 may receive the subband average signal power $\overline{X}_{n,k}$ and subband background noise power $B_{n,k}$ as inputs. Additionally, the speech intelligibility measurement at step 208 may receive or access other data used to generate the speech intelligibility measurement. For example, the speech intelligibility measurement at step 208 may access a band importance function. In this example, the system uses the subband average signal power $\overline{X}_{n,k}$ and subband background noise power $B_{n,k}$ to calculate a signal-to-noise ratio in each subband. FIG. 4 illustrates one implementation of a signal power estimate 402 and a background noise estimate 404 of a speech signal. As shown in FIG. 4, the signal-to-noise ratio varies across the frequency range. In some frequency subbands a high signal-to-noise ratio results (such as in signal portion 406), while in other frequency subbands the signal-to-noise ratio is lower or even negative (such as in signal portion 408).

Figure 5:
FIG. 5 is a graph illustrating one implementation of a band importance function.

At step 208 of FIG. 2, the system may calculate the speech intelligibility measurement based on a band importance function. The band importance function illustrates the recognition that certain frequency bands are more important than others for speech intelligibility purposes. FIG. 5 illustrates one implementation of a band importance function 502. In the example of FIG. 5, the portions of the frequency spectrum between 1000 Hertz and 2500 Hertz have a relatively higher importance value than the very low end of the frequency spectrum (e.g., between 160 Hertz and 400 Hertz) or the very high end of the frequency spectrum (e.g., between 5000 Hertz and 8000 Hertz). The speech intelligibility measurement at step 208 may weigh the importance of each subband to calculate an output value based on the relative importance values and the subband SNR. For example, the speech intelligibility index may be based on the product of a band importance function (e.g., the importance weights of FIG. 5) and a band audibility function (e.g., the signal-to-noise ratio for each subband). If a first subband has a high signal-to-noise ratio and a high importance value, then it will provide a relatively high contribution to the overall intelligibility measurement. Alternatively, if a different subband has the same signal-to-noise ratio as the first subband but with a lower importance value, then this band will provide a lower contribution to the overall intelligibility measurement than the first subband. The importance values used for each band of the band importance function may be set based on the number of bands used and relative importance of each frequency range, as described in the American National Standard, "Methods for the Calculation of the Speech Intelligibility Index," ANSI S3.5-1997. The output of the speech intelligibility measurement of step 208 may be a single measurement for the entire signal or may be a measurement for each subband of the signal.

Figure 6:
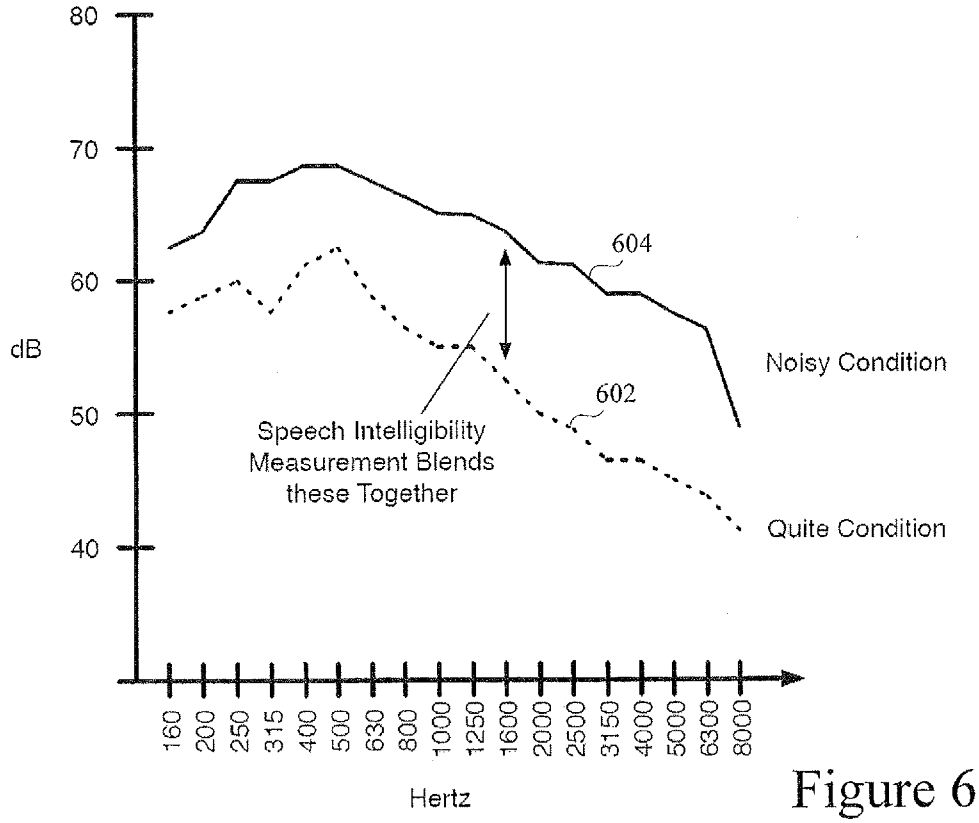
FIG. 6 is a graph illustrating two possible long-term average speech curve templates.

At step 210, the system calculates a target spectral shape to be used later in the process as a reference template for equalization adaptation. Speech averaged over a long period of time has a typical subband shape. The overall shape may be influenced if the talker is male or female or if there is noise present. Two example Long-Term Average Speech Shape ("LTASS") subband shapes are shown in FIG. 6. Specifically, FIG. 6 shows a first template 602 that represents a talker in quiet conditions, and a second template 604 that represents a talker in noisy conditions. The actual LTASS shapes may change based on signal conditions and other factors.

At step 210, the system may use the speech intelligibility measurement (I) from step 208 to calculate a weighted mix of two predetermined LTASS templates. In other implementations, more than two predetermined LTASS templates may be used to calculate the output template shape. As one example, if the speech intelligibility measurement is relatively high, then the average speech signal processed by the system is likely to be more similar to the LTASS shape in the quite conditions. As another example, if the speech intelligibility measurement is relatively low, then the average speech signal processed by the system is likely to be more similar to the LTASS shape in noisy conditions. The weighted long-term speech curve (e.g., the weighted mix of multiple predetermined templates) that is output from step 210 is used as at least part of the target for adaptation of the equalization coefficients. When considering a long term average, the equalized output during the adaptation process may look relatively similar in magnitude at a subband level to the weighted long-term speech curve template. In some implementations, the ability of the shapes to match is a moving target because the equalization coefficients and the weighted long-term speech curve shape may change based on signal conditions.

The weighted long-term speech curve template is used as a reference when modifying speech spectra shape. Standard speech spectrums for different vocal efforts, namely normal, raised, loud and shout can be found in the American National Standard, "Methods for the Calculation of the Speech Intelligibility Index," ANSI S3.5-1997. However, for different applications, those templates may be adjusted to match the actual user environments, such as additive noise level, room acoustics, and microphone frequency response. As one example, the standard free-field LTASS templates may be adjusted based on the impulse response of the space (e.g., a known impulse response of a vehicle compartment) where the input signal is captured. As another example, the standard free-field LTASS templates may be adjusted based on the microphone impulse response of the microphone used to capture the input signal.

In one implementation, the weighted long-term speech curve output from step 210 is constantly or repeatedly adjusted based on the speech intelligibility index according to the following equation:

$$L=(1w)*L_1w*L_2$$

Here, $L_1$ and $L_2$ are the reference LTASS templates for quiet and noisy conditions, respectively, and w is a weight factor calculated according to the following equation:

$$w=1-(I-0.45)/0.3$$

Here, I is the speech intelligibility index limited to be in the range between zero and one. Furthermore, w is limited to be in the range between zero and one. The fixed constants (e.g., 0.45 and 0.3) in the weight factor equation are merely examples, and may be adjusted to control the characteristics of the weighted mix of LTASS templates. For examples, the constant values may be adjusted to more heavily favor the quiet LTASS template over the noisy LTASS template in the weighting equation.

The output of the weighted long-term speech curve adjustment at step 210 is a weighted long-term speech curve, represented as $L_{n,k}$. The weighted long-term speech curve may be generated based on the first predetermined long-term average speech curve (e.g., the quite conditions template), the second predetermined long-term average speech curve (e.g., the noisy conditions template), and the speech intelligibility measurement. However, before the weighted long-term speech curve can be used as a reference for the adaptive equalization process, the system may perform a normalization function at step 212. In one implementation, the weighted long-term speech curve template may be scaled based on the current conditions of the input signal and the noise estimate. For example, an overall energy constraint may be enforced so that the average signal power after applying equalization gains would be similar to the original signal power without equalization. This is achieved by calculating a scaling factor ($\gamma_n$) which is applied to the weighted long-term speech curve template output from step 210 before the template is used in the equalization coefficient adaptation process. The scaling factor may be calculated by the following equation:

$$\gamma_n = \frac{\sum_{k=1}^{M} |\overline{X}_{n,k}|^2 - \sum_{k=1}^{M} |B_{n,k}|^2}{\sum_{k=1}^{M} |L_{n,k}|^2}$$

This normalization serves to minimize the difference between the average input signal power and the average output signal power. For example, the difference in some implementations may be within 1.8 dB.

After the normalized LTASS template is available, the system may perform adaptive equalization based on the normalized LTASS template to improve speech intelligibility of the input signal. The adaptive equalization process includes error signal generation at step 214, application of the prior equalization coefficients at step 216, equalization coefficient control at step 218, and application of the new adapted equalization coefficients at step 220.

At step 214, the system generates an error signal $e_{n,k}$. The adaptive equalization system serves to adjust its equalization coefficients in order to minimize the value of the error signal. In one implementation, the error signal is calculated based on the weighted long-term speech curve template $L_{n,k}$ (with or without normalization), the subband background noise power $B_{n,k}$, and a processed version of the input speech signal. In another implementation, the error signal may be determined without including the subband background noise power $B_{n,k}$ in the calculation. The processed version of the input speech signal used to generate the error signal may be calculated at step 216, where the system applies a prior version of the equalization coefficients ($G_{n-1,k}$) to a power spectrum of the speech signal to generate an equalized signal. This equalized signal is compared to the weighted long-term speech curve template (e.g., the normalized speech curve from step 212) at step 214. Specifically, the system generates a summed signal by summing the background noise level estimate from step 206 with the normalized speech curve from step 212. The difference between the summed signal and the equalized signal from step 216 results in the error signal.

At step 218, the system updates its equalization coefficients in a feedback loop that attempts to drive the error signal to zero. In some implementations, the updates to the equalization coefficients may be smoothed. As one example, for the kth sub-band at time n, the equalizing gain may be calculated according to the following equations:

$$|Y_{n,k}|^2 = G_{n-1,k}|\overline{X}_{n,k}|^2$$

$$e_{n,k} = \gamma_n|L_{n,k}|^2 + |B_{n,k}|^2 - |Y_{n,k}|^2$$

$$G_{n,k} = G_{n-1,k} + \mu_{n,k}\frac{e_{n,k}}{|\overline{X}_{n,k}|^2}$$

Here, μ is the step size, $\gamma_n$ is the scaling factor, and B is the background noise estimation. The value of the step size variable may be set to control the speed of adaptation. In one implementation, the step size may be set to 0.001, although higher or lower values may also be used depending on the desired speed of adaptation.

The system may apply one or more limits on the adaptation of the equalization coefficients. As one example, the system may place a signal-to-noise ratio constraint on the adaptation. In this example, the system may calculate a signal-to-noise ratio of the speech signal, compare the signal-to-noise ratio to a predetermined upper threshold (e.g., 15 dB) or a predetermined lower threshold (e.g., 6 dB), and limit a boosting gain of the equalization coefficients in response to a determination that the signal-to-noise ratio is above the predetermined upper threshold or below the predetermined lower threshold.

As another example, the system may place an intelligibility constraint on the adaptation of the equalization coefficients. In this example, the system may determine whether an adaptation of the equalization coefficients based on the weighted long-term speech curve would increase or decrease the speech intelligibility measurement of the speech signal. The adaptation of the equalization coefficients may be limited in response to a determination that the adaptation of the equalization coefficients would decrease the speech intelligibility measurement. With this constraint, the adaptation of the equalization coefficients should not decrease the intelligibility contribution of each sub-band. If the intelligibility of each subband is not reduced, then the intelligibility of the entire signal should also not be decreased.

As another example, the system may use step size control to constrain adaptation. For example, adaptation is faster when the average speech is far away from the reference template and slower when close.

At step 220, the system applies the new adapted version of the equalization coefficients ($G_{n,k}$) to the speech signal on a subband basis. In one implementation, the subbands overlap so there is already smoothing over frequency. Additionally, the equalization coefficients may be smoothed over time and/or frequency at step 218. At step 222, the signal is resynthesized from the multiple subbands. For example, the signal may be converted back to a pulse code modulation ("PCM") signal. The output signal from step 222 may have a higher level of intelligibility than the input signal received at step 202.

Each of the processes described herein may be encoded in a computer-readable storage medium (e.g., a computer memory), programmed within a device (e.g., one or more circuits or processors), or may be processed by a controller or a computer. If the processes are performed by software, the software may reside in a local or distributed memory resident to or interfaced to a storage device, a communication interface, or non-volatile or volatile memory in communication with a transmitter. The memory may include an ordered listing of executable instructions for implementing logic. Logic or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable storage medium," "machine-readable medium," "propagated-signal" medium, and/or "signal-bearing medium" may comprise a medium (e.g., a non-transitory medium) that stores, communicates, propagates, or transports software or data for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory, such as a Random Access Memory (RAM), a Read-Only Memory (ROM), an Erasable Programmable Read-Only Memory (EPROM or Flash memory), or an optical fiber. A machine-readable medium may also include a tangible medium, as the software may be electronically stored as an image or in another format (e.g., through an optical scan), then compiled, and/or interpreted or otherwise processed. The processed medium may then be stored in a computer and/or machine memory.

While various embodiments, features, and benefits of the present system have been described, it will be apparent to those of ordinary skill in the art that many more embodiments, features, and benefits are possible within the scope of the disclosure. For example, other alternate systems may include any combinations of structure and functions described above or shown in the figures.

What is claimed is:

1. An adaptive equalization method comprising:

generating a speech intelligibility value from a speech signal by a computer processor;

selecting a plurality of predetermined long-term average speech curves;

generating a weighted long-term target spectral shape curve by the computer processor based on the plurality of long-term average speech curves and the speech intelligibility value; and adapting equalization coefficients for the speech signal by the computer processor based on the weighted long-term target spectral shape curve;

where the plurality of long-term average speech curves change based on speech signal conditions.

2. The method of claim 1 where the plurality of predetermined long-term average speech curves comprise long-term average speech shapes.

3. The method of claim 1 where the plurality of predetermined long-term average speech curves are selected based on a source of the speech signal.

4. The method of claim 1 where the plurality of predetermined long-term average speech curves are selected based on gender.

5. The method of claim 1 where the speech signal conditions reflect quiet conditions or noisy conditions.

6. The method of claim 1 where the plurality of predetermined long-term average speech curves are selected based on a level of vocal effort used to generate the speech signal.

7. The method of claim 6 where the level of vocal effort reflects a normal vocal effort, a raised vocal effort, or a shout vocal effort.

8. The method of claim 1 further comprising adjusting one or more of the plurality of predetermined long-term average speech curves based on a user's environment.

9. The method of claim 1 further comprising adjusting one or more of the plurality of predetermined long-term average speech curves based on an additive noise level.

10. The method of claim 1 further comprising adjusting one or more of the plurality of predetermined long-term average speech curves based on room acoustics.

11. The method of claim 1 further comprising adjusting one or more of the plurality of predetermined long-term average speech curves based on a microphone frequency response.

12. The method of claim 1 where the weighted long-term target spectral shape curve comprises a template.

13. The method of claim 12 where the template comprises an output template.

14. The method of claim 1 further comprising adjusting the equalization coefficients in response to signal conditions.

15. The method of claim 1, where generating the speech intelligibility value comprises:

obtaining a signal power measurement for a frequency band of the speech signal;

obtaining a background noise level for the frequency band of the speech signal; and obtaining the speech intelligibility value from the signal power measurement and a background noise level associated with the frequency band of the speech signal.

16. The method of claim 1, where adapting the equalization coefficients comprises:

applying a prior version of the equalization coefficients to a power spectrum of the speech signal to generate an equalized signal; and adapting the equalization coefficients to generate an adapted version of the equalization coefficients based on the equalized signal and the weighted long-term target spectral shape curve.

17. An adaptive equalization system, comprising:

a computer processor;

a speech intelligibility measurement module executable by the computer processor to process a speech intelligibility value of a speech signal;

a spectral shape adjustment module executable by the computer processor to process a weighted long-term target spectral shape curve that varies with speech signal conditions and is based on a plurality of predetermined long-term average speech curves and the speech intelligibility value; and an adaptive equalization module executable by the computer processor to process equalization coefficients for the speech signal based on the weighted long-term target spectral shape curve.

18. The system of claim 17 where the plurality of predetermined long-term average speech curves include a first speech template in quiet conditions and a second speech template in noisy conditions.

19. The system of claim 17 where the plurality of predetermined long-term average speech curves are selected based on gender.

20. The system of claim 17 where the plurality of predetermined long-term average speech curves are selected based on a level of vocal effort that reflects a normal vocal effort, a raised vocal effort, or a shout vocal effort.

* * * * *